United States Patent Office 3,677,792
Patented July 18, 1972

3,677,792
METHOD OF PRODUCING COATED VACUUM
METALLIZED ARTICLES
William J. Best, Union Lake, Mich., assignor to Michael
Ladney, Jr., Grosse Pointe Shores, Mich.
No Drawing. Continuation-in-part of application Ser. No.
452,849, May 3, 1965. This application June 8, 1970,
Ser. No. 44,663
Int. Cl. G02b 17/00
U.S. Cl. 117—35 V
10 Claims

ABSTRACT OF THE DISCLOSURE

A method of vacuum metallizing an article for decorative purposes involving the conventional steps of applying to the article a base coat, a vacuum metallized film over the base coat and a first top coat over the vacuum metallized film and also including the additional step of applying over the first top coat a second top coat of a film-forming, liquid organic material having greater durability than the first top coat and adapted to adhere to the first top coat and be compatible therewith.

---

This application is a continuation-in-part of applicant's prior application Ser. No. 452,849, filed May 3, 1965, now abandoned.

This invention relates to coated vacuum metallized articles, and more particularly, to a method of applying extremely durable coatings to vacuum metallized articles.

Many articles such as knobs, dials, arm-rests for vehicle doors, trim panels, etc. are provided with a decorative finish by vacuum metallizing surfaces thereof and thereafter coating the vacuum metallized surfaces with organic film forming liquids which are adapted to be cured or dried to provide a transparent, colorless protective coating on the article through which the vacuum metallized surface is clearly visible. In most vacuum metallizing operations the article to be vacuum metallized has applied thereto an initial base coat which forms a smooth, glossy foundation coat for the vacuum metallized surface. The types of base coat and top coat that can be utilized in conjunction with vacuum metallized workpieces are limited in their selection to a relatively few coatings. This is due to the fact that many of the organic coating materials do not have good adherence to the plastic article or the vacuum metallized surface thereof or because the solvents required for these organic coating materials have a tendency to attack the plastic material or the vacuum metallized coating thereon. For example, there are relatively few organic coating materials that can be successfully adhered to a thin layer of vaporized aluminum, the most widely used metal in the vacuum metallizing of plastic and metal parts, without adversely affecting either the base plastic, the base coat or the vaporized metal film. Unfortunately, those materials which heretofore have been used as coating materials for vacuum metallized parts are relatively poor from the standpoint of their durability characteristics.

For example, base coats presently used on plastic parts which are to be vacuum metallized are generally of the following types:

Mixture of oil modified urethane resin with varnish and/or alkyd resin
Alkyd resins
Acrylic-alkyd co-polymers
Phenolic and oil varnishes.

Top coats that are currently being used on vacuum metallized parts are generally of the following types:

Oil modified urethane resins
Alkyd resins
Acrylic-alkyd co-polymers.

While the above type coatings are satisfactory from the standpoint of their compatibility with the vaporized metal surface and plastic material from which the article is made and also from the standpoint of producing a transparent coating which does not have a tendency to discolor at the environmental temperatures of the parts, nevertheless, none of the above coatings have what may be considered as excellent durability characteristics. For example, none of the above listed coating materials currently in use are capable of withstanding severe abrasion or prolonged exterior exposure. These disadvantages of the coating materials now being used for vacuum metallized parts therefore seriously limit the extent to which vacuum metallizing can be used for decorative purposes where the parts are subjected to considerable wear, abrasion or exposure to the elements.

In accordance with the present invention, vacuum metallized articles are adapted to have applied thereto coatings which are far superior from the standpoint of durability to the coatings presently being used. The improved coatings usable on vacuum metallized articles in accordance with the present invention are those types of coatings which heretofore have been considered unsuitable for use on vacuum metallized parts. Such improved coatings may be applied to vacuum metallized parts as a finish top coat by providing an intermediate top coat on the vacuum metallized part which is compatible with the vacuum metallized surfaces and the plastic from which the part is formed, on the one hand, and which, on the other hand, serves as a barrier against penetration of the subsequently applied finish top coat.

The organic coating materials which provide durability characteristics far superior to those coatings now being applied to vacuum metallized parts usually incorporate solvents which are normally considered unsuitable for use on vacuum-metallized plastic parts. The more durable coatings generally comprise the organic materials which employ essentially aromatic solvents or the oxygenated solvents such as esters, ketones, ether-alcohols and the esters of ether-alcohols. The conventional organic coatings, on the other hand, are those employing mostly aliphatic solvents which are mild but have a relatively narrow range of solubility. The aromatic solvents have a rather broad range of solvency for organic coating materials, but at the same time such solvents have a tendency to vigorously attack the plastic from which the article is formed. In addition, many organic materials often have very poor adherence to the vaporized metal surface resulting from the vacuum metallizing step. These drawbacks are particularly true with respect to plastics of the acrylonitrile-butadiene-styrene co-polymer types and the polystyrenes. To a lesser extent this is also true with respect to other plastic materials such as nylon, acetal resins, polypropylene, polycarbonates and the phenolic materials. The oxygenated solvents also have a rather broad range of solubility for organic coating materials, but likewise have a tendency to either attack the plastic from which the vacuum metallized parts are formed or attack the base coat on the plastic or provide a poor bond to the vaporized metal surface.

However, when a vacuum metallized part is first top coated with an organic material compatible with the vacuum metallized surface on the base coat and with the plastic from which the article is formed and then has applied thereto a finish top which is compatible with and will not penetrate the first top coat, the vacuum metallized part has imparted to it the durability characteristics of the finish top coat. Thus, in accordance with the present invention, the article has initially applied to it a base coat suitable for receiving the vaporized metal surface produced by the vacuum metallizing step. After vacuum metallizing, the article has applied thereto a first top coat and then a second or finish top coat.

The primary requirements of the base coat are:

(a) it does not attack the base material from which the article is formed;
(b) it must provide a good adhesion to the base material;
(c) it must provide a smooth, uniform and high gloss surface; and
(d) it must be capable of accepting the vaporized metal and this first top coat.

The requirements of the first top coat are:

(a) it must adhere to and be compatible with the vaporized metal layer and the base coat;
(b) it must be perfectly transparent so that the vaporized metal surface resulting from the vacuum metallizing step is clearly visible;
(c) it must not be susceptible to discoloration at the environmental temperatures of the articles; and
(d) it must act as a barrier to the penetration of the second top coat.

The primary requirements of the second or finish top coat are:

(a) it must adhere to the first top coat and be compatible therewith so that it will not destroy it or wrinkle it;
(b) it must possess the desired durability characteristics either from the standpoint of abrasion or exposure to weather or both; and
(c) it must be perfectly transparent so that the vacuum metallized surface is clearly visible; and
(d) it must not be susceptible to discoloration at environmental temperatures.

Surprising as it may seem, many of the more durable organic coating materials now being used for other coating purposes satisfy the requirements of a second or finish top coat for vacuum metallized articles when the base coat and the first top coat comprise the materials which are presently being used on vacuum metallized parts. For example, the following types of materials are admirably suited for second or finish top coats on vacuum metallized parts when the base coat and the first top coat are those referred to above as conventionally used:

(a) Vinyl lacquers
(b) Acrylic lacquers
(c) Melamine alkyds
(d) Exterior durable alkyd acrylics
(e) Exterior durable styrenated alkyds
(f) Durable epoxy resins
(g) Exterior durable urethane resins
(h) Nitrocellulose lacquers Many types of the above listed organic materials suitable for use as the second or finish top coat on vacuum metallized parts have durability characteristics far superior to the conventional top coating materials now being used on vacuum metallized parts.

An excellent method for determining the abrasion durability of top coatings for vacuum metallized parts involves the use of an abrasion testing machine wherein a paper tape is progressively unwound from a feed roll onto a take-up roll and intermediate the two rolls a cam-actuated arm causes a pressure wheel to bring the moving tape intermittently into controlled rubbing engagement with the top coat on a vacuum metallized test specimen. This method of abrasion testing represents a highly accelerated test as compared with other abrasion testing machines heretofore used. Numerous tests have been conducted with the abrasion testing machines described comparing the coatings conventionally used on vacuum metallized parts with the cotings of this invention. Results have shown that ordinary coatings on vacuum metallized parts will withstand about 20 cycles of the testing machine. The top coatings of the present invention, on the other hand, withstand at least 100 cycles and in many instances a much greater number of cycles before failure occurs. For example, a vacuum metallized part having a top coat of oil modified urethane resin was tested and failure resulted with 20 cycles. A similar part having identical base and top coatings with a second top coating of a vinyl lacquer produced a failure only after an excess of 1000 cycles of the machine.

In connection with practicing the present invention, it is important to realize that the second or finish top coat material should not be applied to any portion of the article not coated with at least the first top coat material. This is necessary because, as pointed out previously, the second or finish top coat materials are of the type which normally attack the plastic from which the article is formed. Thus, while the base coat and the first top coat can often be advantageously applied by flow coating techniques, it may be necessary or desirable to apply the finish top coat by spraying. This is important from the practical standpoint because in flow coating workpieces are normally retained by spring clips on a fixture. Thus, if the workpiece were to shift slightly on the fixture after the first top coat is applied, a portion of the workpiece would be exposed to the second top coat which did not have a first top coat thereon. Since a workpiece is normally gripped in a fixture at those portions which are not visible when the workpiece is incorporated in an assembly, the second top coat can be advantageously applied by merely spraying the portions of the workpiece which are visually exposed after final assembly. If desired the portions not covered by the first top coat can be masked.

Spraying of the top coat may also be required by reason of the solvent system used for the top coat material. As a practical mater such solvent systems frequently require the inclusion of several different solvents, each having a specific function in the liquid coating material. For example, the coating material may require a particularly active solvent to dissolve it which, if permitted to remain on the first top coat until it evaporates, may attack it. With such second top coatings additional solvents are employed in the solvent system which are less active and, accordingly, are capable of remaining on the surface of the top coat sufficiently long to get a uniform spreading of the second top coat material. With top coat materials requiring such solvent systems the more active solvent, which usually has a high rate of evaporation, is used merely as a vehicle or carrier for the coating material, enabling the coating material to be sprayed onto the first top coat, and the lesser active solvent or solvents are utilized to promote uniform spreading or flowing of the coating material on the workpiece.

Nitrocellulose lacquers are particularly suitable as second top coat materials because of their durability, their ability to remain transparent and their ability to adhere to most types of commonly used top coating materials for vacuum metallizing. However, nitrocellulose lacquers for the most part require an active solvent, a ketone, for example, and accordingly must be sprayed rather than flow coated.

As an example of a durable top coat material which is highly abrasion resistant and which has the ability to remain transparent at environmental temperatures the following composition has been found particularly suitable:

Clear abrasion resistant topcoat: Percentage by wt.
½ second RS nitrocellulose _____ 25.00
High molecular weight soybean oil epoxide-
    polyester _____ 10.00
Isobutyl isobutyrate _____ 12.00
Toluol _____ 20.00
N-butyl acetate _____ 10.00
Acetone _____ 23.00

In the composition set forth above the epoxide-oplyester is included to impart toughness to the hard film produced by nitrocellulose lacquer. The remaining ingredients comprise the solvent system for the nitrocellulose and the expoxide-polyester. The acetone, which may be replaced by another fast evaporating ketone, is an excellent solvent for the nitrocellulose and the polyester but would have a tendency to attack most first top coat materials if it remained on the surface thereof. On the other hand, the isobutyl isobutyrate is a mild solvent having a substantialy slower evaporation rate and is capable of remaining on the surface of most top coating materials sufficiently long to dry without damaging the same. The N-butyl acetate, which may be replaced by another solvent ester, has an average evaporation rate and the toluol, which is a relatively inexpensive solvent for the polyester, evaporates at a rate faster than the N-butyl acetate. Thus, the components of the solvent system are selected such that, when the lacquer, is sprayed, the acetone is substantially completely evaporated in the spray so that the remaining solvents will promote a uniform spreading or flowing of the lacquer on the workpiece without damaging the second top coat.

The nitrocellulose lacquer composition disclosed above has been used very successfully on vacuum metallized parts wherein both the base coat and the first top coat consisted of a mixture of an oil modified urethane resin and varnish. It will be appreciated that the amount of each ingredient in the composition set forth above can be varied in accordance with the particular requirements or results desired. For example, the nitrocellulose might vary between 20 and 30% of the composition and the epoxide-polyester might vary between 8 and 12%. The amount of each solvent used in the solvent system will depend upon the temperature at which the composition is sprayed, the consistency required and the nature of the first top coat material. While the amount of isobutyl isobutyrate might vary between 5 and 12%, the remaining solvents in the solvent system are preferably present in an amount at least twice that of the isobutyl isobutyrate so that a very large percentage of the solvent evaporates in the spray rather than on the surface of the workpiece itself.

In practicing the invention the precautions normally taken when vacuum metallizing are observed. The part is thoroughly cured or dried between successive coating operations and the solvent in the coating is thus evaporated. Drying or curing is preferably effected by heating the part after each coating operation to a temperature short of that which would adversely affect the part or the coating material. In the case of plastic workpieces, it may be stated that generally speaking the thermosetting materials may be dried at a higher temperature than the thermoplastic materials.

The word "film" as used in the description and claims refers to a hard solid coating which is continuous and self-adherent as distinguished from a migrant liquid or viscous coating.

I claim:

1. In the method of vacuum metallizing a plastic article for decorative purposes those steps which comprises, applying to the article a base coat of a hardenable, film-forming, liquid organic resin solution adapted when dried to form on the article, without attacking the plastic from which the article is made, an adherent, solid, uniform, smooth glossy film which is adapted to accept a layer of vaporized aluminum; vacuum depositing a thin layer of aluminum on said base coat; applying to said vacuum metallized base coat a first top coat of a hardenable, film-forming, liquid organic resin solution adapted when dried to form over said vacuum metallized base coat, without attacking it, an adherent, solid, transparent film which is adapted to remain transparent and colorless at environmental temperatures of the article and which is also adapted to act as a barrier for the hereinafter referred to second top coat; and thereafter spraying over said first top coat a second top coat of a hardenable, film-forming, liquid organic resin solution which when hardened is adapted to form a hard, solid, continuous, transparent film which adheres to said first top coat without attacking the top coated vacuum metallized base coat and which has substantially greater durability than the first top coat and is adapted to remain transparent and colorless at environmental temperatures, said last-mentioned organic solution containing a solvent for the resin which if applied directly to the vacuum deposited aluminum film and/or the plastic surface of the article would tend to attack it, each of said coatings being hardened by drying after application and prior to further processing of the article, said second top coat comprising a nitrocellulose lacquer which includes a solvent system comprising isobutyl isobutyrate and at least one other solvent which has an evaporation rate substantially greater than isobutyl isobutyrate.

2. The method called for in claim 1 wherein said other solvent comprises a fast evaporating ketone.

3. The method called for in claim 2 wherein said nitrocellulose lacquer includes a high molecular weight soybean oil expoxide-polyester.

4. The method called for in claim 3 wherein the solvent system includes toluol.

5. In the method of vacuum metallizing a plastic article for decorative purposes those steps which comprise, applying to the article a base coat of a hardenable, film-forming, liquid organic resin solution adapted when dried to form on the article, without attacking the plastic from which the article is made, an adherent, solid, uniform, smooth glossy film which is adapted to accept a layer of vaporized aluminum; vacuum depositing a thin layer of aluminum on said base coat; applying to said vacuum metallized base coat a first top coat of a hardenable, film-forming, liquid organic resin solution adapted when dried to form over said vacuum metallized base coat, without attacking it, an adherent, solid, transparent film which is adapted to remain transparent and colorless at environmental temperatures of the article and which is also adapted to act as a barrier for the hereinafter referred to second top coat; and thereafter spraying over said first top coat a second top coat of a hardenable, film-forming, liquid organic resin solution which when hardened is adapted to form a hard, solid, continuous, transparent film which adheres to said first top coat without attacking the top coated vacuum metallized base coat and which has substantially greater durability than the first top coat and is adapted to remain transparent and colorless at environmental temperatures, said last-mentioned organic solution containing a solvent for the resin which if applied directly to the vacuum deposited aluminum film and/or the plastic surface of the article would tend to attack it, each of said coatings being hardened by drying after application and prior to further processing of the article, said second top coat comprising a nitrocellulose lacquer, the solvent system for the nitrocellulose lacquer including at least two solvents of substantially different evaporation rates, one of said solvents being adapted to substantially completely evaporate in the spray and the other solvent having a slower evaporation rate to promote uniform flow of the lacquer on the second top coat.

6. The method called for in claim 5 wherein said one solvent is of a type which would normally attack the first top coat and the second solvent is of a type compatible with the first top coat.

7. The method called for in claim 5 wherein said one solvent consists of isobutyl isobutyrate and the other solvent is present in an amount at least twice the amount of isobutyl isobutyrate.

8. In the method of vacuum metallizing a plastic article for decorative purposes those steps which comprise, applying to the article a base coat of a hardenable, film-forming, liquid organic resin solution adapted when dried to form on the article, without attacking the plastic from which the article is made, an adherent, solid, uniform, smooth glossy film which is adapted to accept a layer of vaporized aluminum; vacuum depositing a thin layer of aluminum on said base coat; applying to said vacuum metallized base coat a first top coat of a hardenable, film-forming, liquid organic resin solution adapted when dried to form over said vacuum metallized base coat, without attacking it, an adherent, solid, transparent film which is adapted to remain transparent and colorless at environmental temperatures of the article and which is also adapted to act as a barrier for the hereinafter referred to second top coat; and thereafter spraying over said first top coat a second top coat of a hardenable, film-forming, liquid organic resin solution which when hardened is adapted to from a hard, solid, continuous, transparent film which adheres to said first top coat without attacking the top coated vacuum metallized base coat and which has substantially greater durability than the first top coat and is adapted to remain transparent and colorless at environmental temperatures, said last-mentioned organic solution containing a solvent for the resin which if applied directly to the vacuum deposited aluminum film and/or the plastic surface of the article would tend to attack it, each of said coating being hardened by drying after applicttion and prior to further processing of the article, said second top coat consisting by weight essentially of: 20–30% of ½ second RS nitrocellulose; 8–12% of a high molecular weight soybean oil epoxide-polyester; 5–20% of isobutyl isobutyrate; and the remainder of a solvent which has a more rapid evaporation rate than the isobutyl isobutyrate.

9. The method called for in claim 8 wherein said remainder of said solvent consists essentially of fast evaporating ketone, a solvent ester having a medium evaporation rate and toluol.

10. In the method of vacuum metallizing a plastic article for decorative purposes those steps which comprise, applying to the article a base coat of a hardenable, film-forming, liquid organic resin solution adapted when dried to form on the article, without attacking the plastic from which the article is made, an adherent, solid, uniform, smooth glossy film which is adapted to accept a layer of vaporized aluminum; vacuum depositing a thin layer of aluminum on said base coat; applying to said vacuum metallized base coat a first top coat of a hardenable, film-forming, liquid organic resin solution adapted when dried to form over said vacuum metallized base coat, without attacking it, an adherent, solid, transparent film which is adapted to remain transparent and colorless at environmental temperatures of the article and which is also adapted to act as a barrier for the hereinafter referred to second top coat; and thereafter spraying over said first top coat a second top coat of a hardenable, film-forming, liquid organic resin solution which when hardened is adapted to form a hard, solid, continuous, transparent film which adheres to said first top coat without attacking the top coated vacuum metallized base coat and which has substantially greater durability than the first top coat and is adapted to remain transparent and colorless at environmental temperatures, said last-mentioned organic solution containing a solvent for the resin which if applied directly to the vacuum deposited aluminum film and/or the plastic surface of the article would tend to attack it, each of said coating being hardened by drying after application and prior to further processing of the article, said last-mentioned solution including a solvent system containing at least two solvents of different evaporation rates, one of said solvents being of the type which would normally attack the first top coat if allowed to remain thereon but which has an evaporation rate such that it substantially completely evaporates in the spray, the other solvent having a slower evaporation rate and being compatible with the first top coat.

References Cited

UNITED STATES PATENTS

| | | | |
|---|---|---|---|
| 2,699,402 | 11/1955 | Meyer | 117—35 V |
| 2,767,105 | 10/1956 | Fletcher | 117—71 |
| 2,993,806 | 7/1961 | Fisher et al. | 117—71 |

EDWARD G. WHITBY, Primary Examiner

U.S. Cl. X.R.

117—5.5, 71 R, 72, 73, 104 R, 138.8 A, 138.8 E, 138.8 N, 161 C, 161 KP, 161 UZ, 161 UN, 161 ZB, 166; 161—213